United States Patent [19]

LeShane et al.

[11] Patent Number: 4,815,940
[45] Date of Patent: Mar. 28, 1989

[54] FATIGUE STRENGTHENED COMPOSITE ARTICLE

[75] Inventors: Jeffrey S. LeShane, Glastonbury; Kostas Routsis, East Hartford; Charles R. Watson, Windsor, all of Conn.

[73] Assignee: United Technologies Corporation, Hartford, Conn.

[21] Appl. No.: 882,624

[22] Filed: Aug. 4, 1986

[51] Int. Cl.$^4$ .............................................. C25D 7/00
[52] U.S. Cl. .................................. 416/241 A; 204/23
[58] Field of Search ........... 416/241 R, 241 A, 241 B, 416/243; 204/34, 41, 49, 23, 40

[56] References Cited

U.S. PATENT DOCUMENTS

| | | | |
|---|---|---|---|
| 1,282,265 | 10/1918 | Merritt | 416/229 |
| 2,423,700 | 7/1947 | Hardy | 170/159 |
| 2,732,020 | 1/1956 | Scholl | 170/159 |
| 2,800,438 | 7/1957 | Stareck | 204/41 |
| 2,842,487 | 7/1958 | Carr | 204/49 |
| 3,357,850 | 12/1967 | Baker | 416/229 |
| 3,572,971 | 3/1971 | Seiwert | 416/230 |
| 3,594,288 | 7/1971 | Reinert | 204/34 |
| 3,602,608 | 8/1971 | Morley | 416/224 |
| 3,694,104 | 9/1972 | Erwin | 416/217 |
| 3,762,835 | 10/1973 | Carlson et al. | 416/224 |
| 3,895,922 | 7/1975 | Phillips | 72/377 |
| 4,108,572 | 8/1978 | Platt | 416/230 |

FOREIGN PATENT DOCUMENTS 1083190 10/1964 United Kingdom .

OTHER PUBLICATIONS

Technical Report AFML-TR-70-111, by James H. Weaver, Electrodeposited Nickel Coatings for Erosion Protection, Jul. 1970.

Primary Examiner—Henry A. Bennet

[57] ABSTRACT

A composite article includes a compressively stressed plating which provides increased static strength and fatigue life. In particular, a fan exit guide vane (1), made of a graphite fiber reinforced composite material and including a conductive plating (7), achieves a 380% increase in static load capability over an unplated composite vane and a low cycle fatigue life of over 1 million cycles through the application of a compressively stressed nickel plating (8) which produces a residual compressive stress state of between −5,000 and −15,000 psi.

4 Claims, 3 Drawing Sheets

FATIGUE STRENGTHENED COMPOSITE ARTICLE

TECHNICAL FIELD

This invention relates to composite articles, and more particularly to plated composite articles having increased fatigue strength and erosion resistance.

BACKGROUND ART

There has been an increase in the use of composite materials in the fabrication of components for aircraft gas turbine engines. Articles made from composite materials offer significant advantages in terms of lower weight and reduced part counts, providing substantial savings in engine assembly, operation and maintenance costs. One article currently under review for a conversion to composite construction is a fan exit guide vane for a gas turbine engine.

Composite fan exit guide vanes have been fabricated and tested against the current vanes made of aluminum, with the composite articles found to be deficient in both fatigue strength and erosion resistance. One method for improving the erosion resistance of composite articles is to include a metal plating on the surface of the composite. In U.S. Pat. Nos. 3,762,835 to Carlson et al, 4,108,572 and 3,572,971 to Seiwert, various metal sheaths, cladding and coatings are discussed for addition to composite articles for improving impact strength and erosion resistance. In U.S. Pat. No. 3,572,971, a titanium cladding is bonded to a composite compressor blade, with the cladding providing erosion protection as well as increased transverse and torsional strength. However, there is no discussion of the fatigue effects involved with these claddings or coatings.

From the experience gained in the plating of metal articles, it is generally known that the addition of a hard plating, such as chromium, may have a detrimental effect on fatigue life. In U.S. Pat. No. 2,732,020 to Scholl, a method for increasing the fatigue strength of metal articles is discussed. While not addressing the fatigue problems with composite articles, it is illustrative of the fatigue problems involved with platings. Generally, an aluminum airfoil having a nickel plating electroplated thereon, exhibited fatigue failure after several hours of fatigue testing. By disposing an elastomeric layer between the aluminum substrate and the nickel plating, the fatigue life was increased to fifty hours. However, an intermediate elastomeric layer would be undesirable in many applications, particularly in high temperature service, and may compromise other properties, such as static strength.

In order to utilize composite articles as replacements for metal articles in gas turbine engines, what is needed is a composite article which has erosion resistance equivalent or superior to metal and increased fatigue life.

DISCLOSURE OF INVENTION

It is an object of the present invention to provide a composite article which displays increased erosion resistance as well as increased fatigue life.

It is a further object of the present invention to provide a composite fan exit guide vane which provides increased erosion resistance and fatigue life without incurring a severe weight penalty.

These and other objects of the present invention are achieved by utilizing a compressively stressed metal plating, applied to the surface of a composite article, which produces a residual compressive stress state, preferably producing a residual compressive stress state of $-5000$ to $-15,000$ psi. In particular, a composite fan exit guide vane, which includes a conductive plating, and a compressively stressed nickel plating, with the combined platings achieving a thickness of about 5.5 mil on the convex (suction) side and 4.5 mil on the concave (pressure) side with about 8–9 mil on the leading and trailing edges, has been found to exhibit increased static strength, from a load limit of 190 lbs (unplated) to 725 lbs, a 380% increase. An unplated vane failed on loading to the required fatigue load whereas the plated vane exhibited a low cycle fatigue life in excess of 1 million cycles. Such a substantial increase in static strength and fatigue life is suprising in view of the experience with the plating of metals where fatigue life is detrimentally affected by the addition of a plating. Utilizing a residual compressively stressed plating allows use of the plated article in aplications previously restricted due to the limited fatigue performance of unplated composite articles.

BEST MODE FOR CARRYING OUT THE INVENTION

Figure 1:
FIG. 1 is a perspective view of a composite fan exit guide vane which includes a plating having a residual compressive stress state.

Referring to FIG. 1, a fan exit guide vane 1 composed of a composite material includes an airfoil 2 which has a convex (suction) surface 3, and a concave (pressure) surface 4. The surfaces 2 and 3 of the vane 1 meet at a leading edge 5 and a trailing edge 6. While a fan exit guide vane is illustrative of the present invention, it will be understood by those skilled in the art that any composite article requiring increased fatigue strength could benefit from this invention.

For illustrative purposes, the vane 1 is composed of Ultem ™ polyetherimide resin with 40 weight % carbon fiber reinforcment. The Ultem resin is manufatured by the General Electric Corp., Plastics Division. While such a composite material is exemplary, it will be understood by those skilled in the art that other composite materials would also benefit from the inventive plating. For example, epoxy, polyamide-imide or polyimide resins may be substituted for the Ultem resin in the composite. Similarly, other fiber materials, made of, for example, glass or polyamide, may be substituted for the carbon fibers in the composite.

The vane 1 is plated in a generally conventional fashion, which may include, but is not limited to, the steps of preheating the article to drive out moisture, mechanical finishing the surface, washing the article in an appropriate solution, contacting the article with a plating promoter, contacting the article with an activator, contacting the article with an accelerator, plating with a conducting agent, such as copper (electroless followed by electrolytic copper), media finishing the conducting surface, and then plating the article with a fatigue strengthing metal plating material which provides a residual compressive stress of between −5000 and −15,000 psi, such as compressively stressed sulfamate nickel. It should be noted that use of a conducting agent may be unnecessary with conductive composite materials and that the particular details of the plating operation may vary depending on the article to be plated, the choice of composite material and equipment utilized.

The critical operation is the plating of the article with a material which adds a residual compressive stress state to the article surface. While a nickel plating is discussed, any plating material which provides a residual compressive stress may be used. In addition to nickel plating, cobalt or alloy nickel-cobalt plating may also be used. Generally, a plating thickness of 2-20 mils is effective for fatigue strengthening composite articles, with the plating thickness determined by the desired fatigue life. It will be understood by one skilled in the art that plating distribution is a function of bath phenomena and that non-uniform thickness distributions may be achieved.

EXAMPLE

An Ultem⊥/40 weight % carbon fiber reinforced fan exit guide vane (FEGV), having a convex surface, a concave surface, leading and trailing edges, is plated according to the following procedure. The vane is first heated to 300° F. for 2 hours to drive out moisture, then mechanically finished and alkaline cleaned, such as by treating with a sodium hydroxide solution at 150° F. for 5 minutes. The clean vane is then rinsed and neutralized in an acid solution, such as one containing 10% by volume hydrochloric acid (HCL) and 4% Enplate TM 492. Enplate TM 492 is an acid solution combined with a wetting agent, and the Enplate plating chemicals are manufactured by Enthone, Inc., West Haven, Conn. After another rinsing, the vane is treated with a promoter such as 0.5% Enplate promoter 9598 for 30 seconds, rinsed again, activated with a mixture of palladium chloride and hydrochloric acid, such as 1.5% Enplate activator 444 and 25% HCL, for 5 minutes. The vane is rinsed and accelerated in an acid solution containing 2.5% sulfuric acid and 4% Enplate 492 for 3 minutes.

After another rinse, the vane is coated with an electroless copper, such as Cu-750, which is also manufactured by Enthone, Inc. The electroless copper is applied by immersion in a bath solution, with the copper precipitating on the article surfaces. The copper coated vane is then rinsed and baked in air at 220° F. for ½ hour, alkali cleaned, rinsed, and activated in a 10% sulfuric acid solution. The vane is then electroplated in bright acid copper at plating currents up to 6.8 amps per vane, plating for 25 minutes at room temperature, then rinsed and media finished in a vibratory tub. The copper plating achieves a thickness of from 0.6 to 0.8 mil and acts as a conducting agent to allow further platings to be added.

A nickel plating is added to the copper plated vane using a sulfamate bath, containing compressively stressed nickel sulfamate having a stress between −5000 and −15,000 psi. The vane is alkali cleaned, rinsed, activated in a 10% sulfuric acid solution, and placed in the nickel sulfamate bath at 1.5 volts, plating at 10 amps for 30 minutes, raising to 30 amps and plating for 30 minutes and then, raising to b 45 amps and plating for 3 hours. These voltages and currents may vary depending on the particular fixturing device used and the article geometry. The final vane has a 4.5 mil plating on the concave side and 5.5 mil on the convex side with about 8-9 mil on the leading and trailing edges, these thicknesses including the copper plating thickness. Such a plating thickness distribution provides maximum protection for the leading and trailing edges of the vane, which are most susceptible to damage.

Figure 1A:
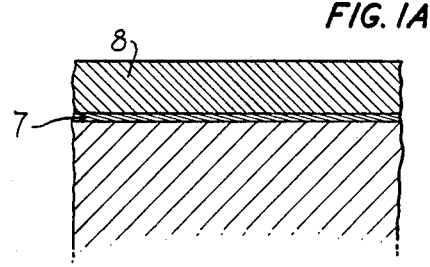
FIG. 1a is a end sectional view along line 1a—1a of FIG. 1.
Figure 2:
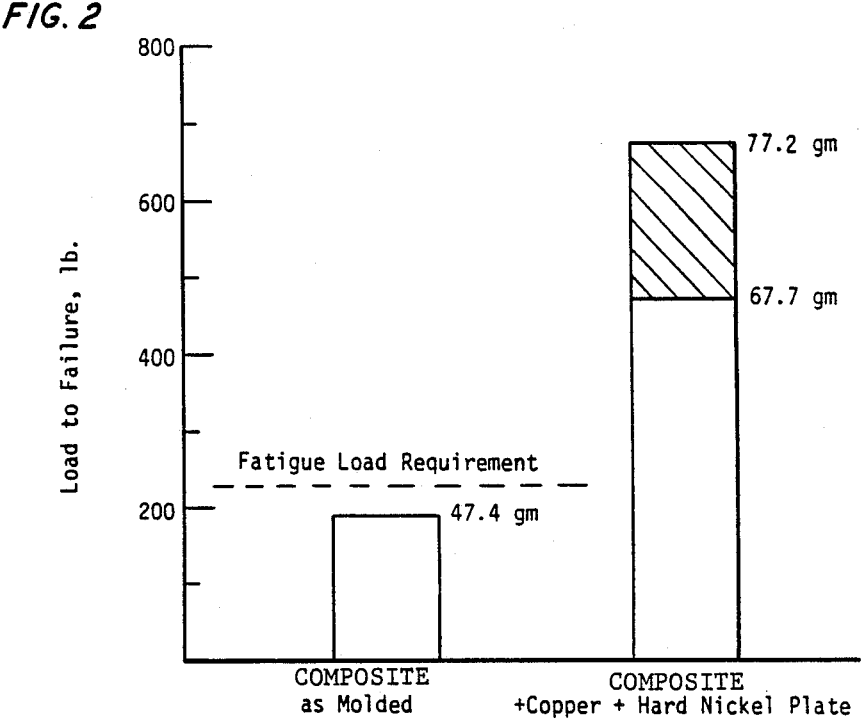
FIG. 2 is a graph demonstrating the static load achieved by the inventive vane as opposed to an unplated composite vane.

Referring to FIG. 1a, an end sectional view of the illustrative composite fan exit guide vane 1 is shown, plated according to the described process. The vane 1 has a conductive copper plating 7 and a compressively stressed nickel plating 8. Such a plated vane was evaluated and found to exhibit substantially increased static load strength. Referring to FIG. 2, a graph is shown which displays the results of static tests in terms of part weight and fatigue load, with the plating thicknesses measured at the suction surface midpoint. From the graph it can be seen that an unplated composite vane has a 3 point bending load limit of about 190 lbs. To be considered for use as a fan exit guide vane, replacing an aluminum vane, the composite vane must at least match the fatigue load requirement which is 230 lbs (based on aluminum at a 15 ksi stress). Therefore, an unplated composite vane would be an unsuitable replacement for aluminum in this application. By adding a compressively stressed nickel plating to the surface of the composite vane, the load limit was increased to 725 lbs, a 380% improvment over the unplated composite, thereby allowing use of a composite vane in a gas turbine engine.

Figure 3:
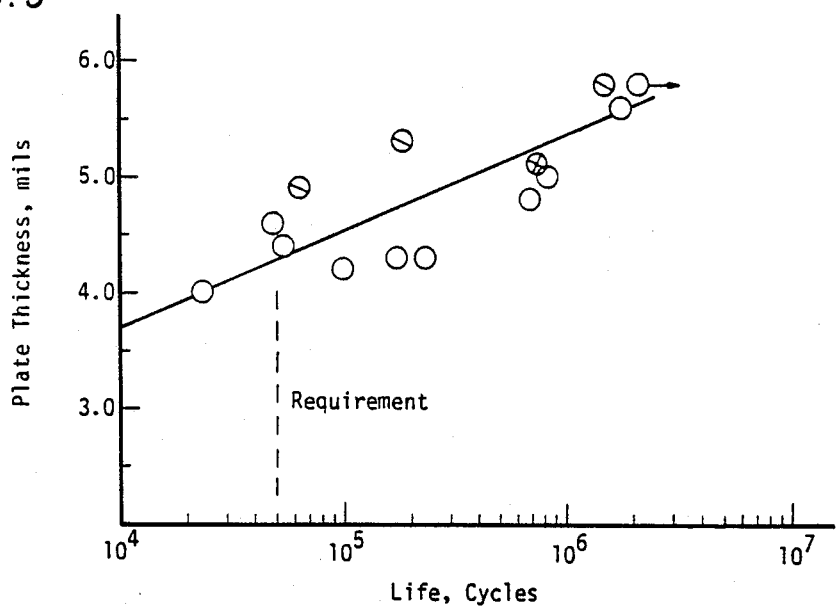
FIG. 3 is a graph demonstrating the relationship between fatigue life and plating thickness.

Referring to FIG. 3, the low cycle fatigue life versus plating thickness is shown. These results are based on a 3 point bending load of 230 lbs., at 235° F. and 10 cycles/sec. The requirement for the fan exit guide vane is approximately 50,000 cycles. An unplated vane was tested and failed while loading to the required 230 lbs. From the graph it is seen that with a 4.5 mil plating the requirement is easily achieved, and that a linear relationship exists between fatigue life and plating thickness. By increasing the plating thickness to approximatly 5 mil, the fatigue life is increased beyond 1 MM cycles. This relationship allows matching the fatigue life of an article with design requirements by varying the plating thickness.

An important consideration in the use of plated composite articles is the effect of erosion or impact damage on fatigue life. Referring again to FIG. 3, several data points are shown which illustrate the effects of erosion and leading edge damage to the fatigue life of a fan exit guide vane. The crossed data point indicates erosion damage and the slashed data points indicate leading edge damage. A FEGV having a 5.0 mil plating was subjected to an abrasive environment consisting of 150 grit alumina propelled at 300 ft/sec for 8 hours. From the graph it is seen that no sustantial reduction in fatigue life occured. Similarly, 3 FEGVs were impacted with a cross peen hammer on the leading edge and fatigue tested. While fatigue life was reduced, the damaged vanes still provided the required 50,000 cycle life.

In terms of weight reduction, the aluminum fan exit guide vane has a weight of 95 grams as opposed to the plated vane which may have a weight of from 55 to 95 grams, depending on the fatigue life and static strength desired (see FIG. 2). Even at double the fatigue load requirement (460 lbs at 67.7 grams), there is a 30% weight savings over the aluminum vane.

Figure 4:
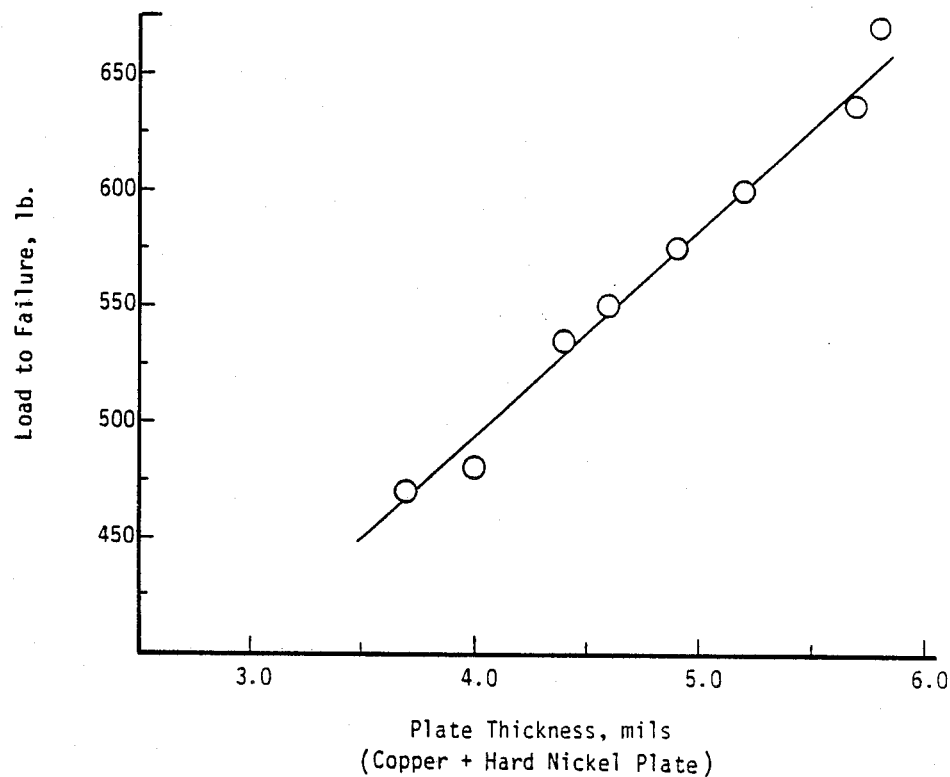
FIG. 4 is a graph demonstrating the linear relationship between plating thickness and static strength.

Referring to FIG. 4, it has been found that there is also a linear relationship between plating thickness and static strength, thereby allowing matching of plating thickness to static load requirements. For example, a plating of 4 mil provides a load to failure of 475 lbs., while a plating of 5 mil increases the load to failure to 575 lbs.

While this invention has been described in relation to a composite fan exit guide vane for use in a gas turbine engine, it will be understood by those skilled in the art that this invention may be utilized with any composite article requiring increased erosion resistance static strength and fatigue life. It will also be understood by those skilled in the art that various changes can be made to the plating method, plating thickness and composite type without varying from the scope of the invention.

Having thus described the invention, what is claimed is:

1. An erosion resistant, fatigue resistant composite fan exit guide vane, comprising:
   a fiber reinforced resin matrix composite body, said body having a leading edge, an opposing trailing edge, a convex surface extending from the leading edge to the trailing edge and an opposing concave surface extending from the leading edge to the trailing edge,
   a conductive layer substantially covering the surfaces and the edges of the body, and
   a compressively stressed metal plating substantially covering the conductive layer,
   wherein the composite fan exit guide vane exhibits high erosion resistance and high fatigue resistance under cyclic stress at an elevated temperature in an abrasive environment.

2. The composite fan exit guide vanes of claim 1 wherein the fiber reinforced resin matrix composite body comprises a graphite fiber reinforced polyetherimide matrix composite body, the conductive layer comprises a copper layer, and the compressively stressed metal plating comprises a compressively stressed nickel, cobalt or nickel-cobalt alloy plating.

3. The composite fan exit guide vane of claim 1 wherein the conductive layer has a thickness between about 0.0006 inch and 0.0008 inch, and the compressively stressed metal plating has a thickness of between about 0.002 inch and about 0.02 inch.

4. The composite fan exit guide vane of claim 3 wherein the conductive layer and the compressively stressed metal plating have a combined thickness of 0.0045 inch on the convex surface, 0.0055 inch on the concave surface, and between about 0.008 inch and about 0.009 inch on the leading and trailing edges.

* * * * *

UNITED STATES PATENT AND TRADEMARK OFFICE
CERTIFICATE OF CORRECTION

PATENT NO. : 4,815,940

DATED : March 28, 1989

INVENTOR(S) : Jeffrey S. LaShane, Kostas Routsis & Charles R. Watson

It is certified that error appears in the above-identified patent and that said Letters Patent is hereby corrected as shown below:

FRONT PAGE

"Appl. No.: 882,624" should be --Appl. No.: 892,624--.

Signed and Sealed this

Twenty-first Day of November, 1989

Attest:

JEFFREY M. SAMUELS

*Attesting Officer*     *Acting Commissioner of Patents and Trademarks*